United States Patent
Hörpel et al.

(10) Patent No.: US 9,214,659 B2
(45) Date of Patent: Dec. 15, 2015

(54) USE OF A CERAMIC SEPARATOR IN LITHIUM ION BATTERIES, COMPRISING AN ELECTROLYTE CONTAINING IONIC FLUIDS

(75) Inventors: Gerhard Hörpel, Nottuln (DE); Volker Hennige, Dülmen (DE); Christian Hying, Rhede (DE); Sven Augustin, Ober-Ramstadt (DE); Carsten Jost, Düsseldorf (DE)

(73) Assignee: EVONIK DEGUSSA GmbH, Essen (DE)

( * ) Notice: Subject to any disclaimer, the term of this patent is extended or adjusted under 35 U.S.C. 154(b) by 837 days.

(21) Appl. No.: 11/578,664

(22) PCT Filed: Feb. 24, 2005

(86) PCT No.: PCT/EP2005/050789
§ 371 (c)(1),
(2), (4) Date: Aug. 17, 2007

(87) PCT Pub. No.: WO2005/104269
PCT Pub. Date: Nov. 3, 2005

(65) Prior Publication Data
US 2008/0138700 A1    Jun. 12, 2008

(30) Foreign Application Priority Data

Apr. 20, 2004   (DE) .................. 10 2004 018 930

(51) Int. Cl.
*H01M 2/16*   (2006.01)
*B05D 3/00*   (2006.01)
(Continued)

(52) U.S. Cl.
CPC ............... *H01M 2/14* (2013.01); *H01M 2/162* (2013.01); *H01M 2/1626* (2013.01); *H01M 8/0293* (2013.01); *H01M 10/0525* (2013.01);
(Continued)

(58) Field of Classification Search
USPC .......................................... 429/334, 310, 324
See application file for complete search history.

(56) References Cited

U.S. PATENT DOCUMENTS 5,827,602 A * 10/1998 Koch et al. ................... 429/328
6,096,173 A    8/2000 Von Hippel et al.
(Continued)

FOREIGN PATENT DOCUMENTS

DE   101 42 622   3/2003
DE   102 08 277   9/2003
(Continued)

OTHER PUBLICATIONS

George E. Blomgren, "Liquid Electrolytes for Lithium and Lithium-Ion Batteries," Journal of Power Sources, 119-121 (2003, 326-329.
(Continued)

*Primary Examiner* — Barbara Gilliam
*Assistant Examiner* — Adam A Arciero
(74) *Attorney, Agent, or Firm* — Oblon, McClelland, Maier & Neustadt, L.L.P.

(57) ABSTRACT

The invention relates to a separator filled with an electrolyte composition. The separator has a ceramic surface and the electrolyte composition comprises an ionic fluid. Filling with the electrolyte composition can take place, for example, by inserting the separator into a battery, e.g. into a lithium ion battery, which is filled with a corresponding electrolyte composition.

26 Claims, 2 Drawing Sheets

Figure 1:
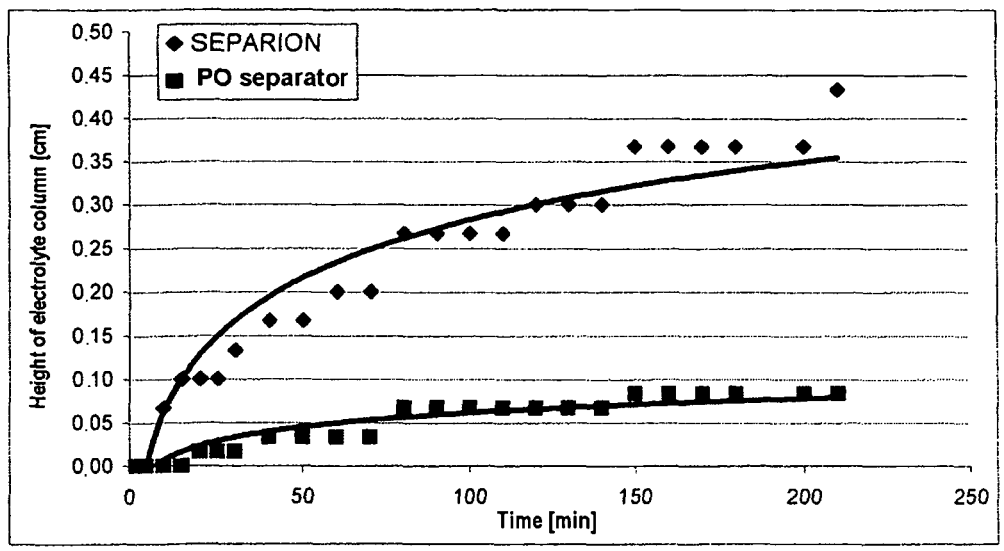

(51) Int. Cl.
  *H01M 2/14* (2006.01)
  *H01M 8/02* (2006.01)
  *H01M 10/0525* (2010.01)
  *H01M 10/0566* (2010.01)

(52) U.S. Cl.
  CPC .. *H01M10/0566* (2013.01); *H01M 2300/0025* (2013.01); *H01M 2300/0094* (2013.01); *Y02E 60/122* (2013.01); *Y02E 60/50* (2013.01)

(56) References Cited

U.S. PATENT DOCUMENTS

| | | |
|---|---|---|
| 6,299,668 B1 | 10/2001 | Penth et al. |
| 6,299,778 B1 | 10/2001 | Penth et al. |
| 6,309,545 B1 | 10/2001 | Penth et al. |
| 6,340,379 B1 | 1/2002 | Penth et al. |
| 6,383,386 B1 | 5/2002 | Hying et al. |
| 6,458,750 B1 | 10/2002 | Dardin et al. |
| 6,485,862 B1 * | 11/2002 | Yoshioka et al. ............ 429/127 |
| 6,620,320 B1 | 9/2003 | Hying et al. |
| 6,728,096 B1 * | 4/2004 | Smith et al. ............ 361/523 |
| 6,841,075 B2 | 1/2005 | Penth et al. |
| 7,235,298 B2 | 6/2007 | Katusic et al. |
| 7,288,501 B2 | 10/2007 | Auer et al. |
| 7,351,494 B2 * | 4/2008 | Hennige et al. ............ 429/129 |
| 7,374,743 B2 | 5/2008 | Katusic et al. |
| 7,691,529 B2 | 4/2010 | Hennige et al. |
| 7,892,673 B2 | 2/2011 | Hennige et al. |
| 8,053,102 B2 | 11/2011 | Hennige et al. |
| 2001/0036437 A1 | 11/2001 | Gutsch et al. |
| 2001/0055639 A1 | 12/2001 | Moritz et al. |
| 2002/0015883 A1 * | 2/2002 | Hilarius et al. ............ 429/188 |
| 2002/0023419 A1 | 2/2002 | Penth et al. |
| 2002/0039648 A1 | 4/2002 | Horpel et al. |
| 2003/0206854 A1 | 11/2003 | Gutsch et al. |
| 2004/0028913 A1 | 2/2004 | Hennige et al. |
| 2004/0038105 A1 | 2/2004 | Hennige et al. |
| 2004/0262169 A1 | 12/2004 | Hying et al. |
| 2005/0031942 A1 | 2/2005 | Hennige et al. |
| 2005/0058907 A1 * | 3/2005 | Kurihara et al. ............ 429/232 |
| 2005/0070193 A1 | 3/2005 | Hennige et al. |
| 2005/0084761 A1 | 4/2005 | Hennige et al. |
| 2005/0087491 A1 | 4/2005 | Hennige et al. |
| 2005/0221165 A1 | 10/2005 | Hennige et al. |
| 2005/0221192 A1 * | 10/2005 | Hennige et al. ............ 429/246 |
| 2005/0255769 A1 * | 11/2005 | Henninge et al. ............ 442/59 |
| 2006/0024569 A1 | 2/2006 | Hennige et al. |
| 2006/0035137 A1 * | 2/2006 | Maruo et al. ............ 429/46 |
| 2006/0046138 A1 | 3/2006 | Hennige et al. |
| 2006/0078791 A1 | 4/2006 | Hennige et al. |
| 2006/0166085 A1 | 7/2006 | Hennige et al. |
| 2007/0175362 A1 | 8/2007 | Gutsch et al. |
| 2007/0184993 A1 | 8/2007 | Scherer et al. |
| 2007/0213237 A1 | 9/2007 | Scherer et al. |
| 2007/0219101 A1 | 9/2007 | Scherer et al. |
| 2007/0254178 A1 | 11/2007 | Nun |
| 2008/0084686 A1 | 4/2008 | Gutsch et al. |
| 2008/0190841 A1 | 8/2008 | Pascaly et al. |
| 2008/0274394 A1 | 11/2008 | Schormann et al. |
| 2008/0280050 A1 | 11/2008 | Nun et al. |
| 2008/0283171 A1 | 11/2008 | Nun et al. |
| 2008/0305702 A1 | 12/2008 | Nun et al. |
| 2009/0078485 A1 | 3/2009 | Gutsch et al. |
| 2009/0269489 A1 | 10/2009 | Hennige et al. |
| 2010/0000079 A1 | 1/2010 | Hörpel et al. |
| 2010/0003401 A1 | 1/2010 | Hörpel et al. |
| 2011/0206971 A1 | 8/2011 | Hennige et al. |
| 2012/0251890 A1 | 10/2012 | Pascaly et al. |
| 2012/0308871 A1 | 12/2012 | Pascaly et al. |
| 2014/0127546 A1 | 5/2014 | Pascaly et al. |

FOREIGN PATENT DOCUMENTS

| | | | | |
|---|---|---|---|---|
| DE | 102 08 280 | | 9/2003 | |
| DE | 102 40 032 | | 3/2004 | |
| EP | 1 380 569 | | 1/2004 | |
| JP | 11-307121 | | 11/1999 | |
| JP | 2002-373704 | | 12/2002 | |
| JP | WO2004021500 | * | 3/2004 | ............ H01M 10/40 |
| WO | WO 99/15262 | | 4/1999 | |
| WO | WO 99/62624 | | 12/1999 | |
| WO | WO 01/93363 | | 12/2001 | |
| WO | WO 03/021697 | | 3/2003 | |
| WO | WO03021697 | * | 3/2003 | ............ H01M 2/16 |
| WO | WO 03021697 | * | 3/2003 | ............ H01M 2/16 |
| WO | WO 03/072231 | | 9/2003 | |
| WO | WO 03/073534 | | 9/2003 | |
| WO | WO 2004/021469 | | 3/2004 | |
| WO | WO 2004/021474 | | 3/2004 | |
| WO | WO 2004/021475 | | 3/2004 | |
| WO | WO 2004/021476 | | 3/2004 | |
| WO | WO 2004/021477 | | 3/2004 | |
| WO | WO 2004/021499 | | 3/2004 | |
| WO | WO 2004021475 A1 | * | 3/2004 | |
| WO | WO 2004021499 A2 | * | 3/2004 | |
| WO | WO 2004021500 | * | 3/2004 | ............ H01M 10/40 |
| WO | WO 2004/082059 | | 9/2004 | |

OTHER PUBLICATIONS

D. Knittel, et al., "Untersuchungen Zur Permanenten Oleophobausruestung—Reaktive Fluorierte Verbindungen," Melliant Textilberichte May 1998.

Peter Wasserscheid, et al., "Ionische Fluessigkeiten-neue, Loesungen fuer die Uebergangsmetallkatalyse," Aufsatze.

Thomas Welton, "Room-Temperature Ionic Liquids, Solvents for Synthesis and Catalysis," Chem. Rev. 1999, 99, 2071-2083.

Andrew Webber, "Ionic Liquids for Lithium Ion and Related Batteries," Advances in Lithium-Ion Batteries, Pbulished 2002.

U.S. Appl. No. 10/588,952, filed Aug. 10, 2006, Nun, et al.
U.S. Appl. No. 10/575,759, filed Apr. 13, 2006, Hennige, et al.
U.S. Appl. No. 10/575,734, filed Apr. 13, 2006, Hoerpel, et al.
U.S. Appl. No. 10/575,274, filed Apr. 11, 2006, Hennige, et al.
U.S. Appl. No. 10/575,268, filed Apr. 11, 2006, Hennige, et al.
U.S. Appl. No. 10/547,829, filed Oct. 19, 2006, Jost, et al.
U.S. Appl. No. 12/063,626, filed Feb. 12, 2008, Hying, et al.
U.S. Appl. No. 11/577,542, filed Apr. 19, 2007, Hoerpel, et al.
U.S. Appl. No. 11/917,914, filed Dec. 18, 2007, Holzapfel, et al.
U.S. Appl. No. 12/388,671, filed Feb. 19, 2009, Hennige, et al.
U.S. Appl. No. 60/021,600, filed Jul. 11, 1996, Riemenschneider, et al.
U.S. Appl. No. 08/842,775, filed Apr. 17, 1997, Riemenschneider, et al.
U.S. Appl. No. 09/441,439, filed Jul. 11, 1999, Barthold, et al.
U.S. Appl. No. 60/194,367, filed Apr. 4, 2002, Michael, et al.
U.S. Appl. No. 12/746,683, filed Jun. 7, 2010, Hedrich, et al.
U.S. Appl. No. 13/266,940, filed Oct. 28, 2011, Pascaly, et al.
U.S. Appl. No. 12/670,483, filed Jan. 25, 2010, Pascaly, et al.

* cited by examiner

USE OF A CERAMIC SEPARATOR IN LITHIUM ION BATTERIES, COMPRISING AN ELECTROLYTE CONTAINING IONIC FLUIDS

The present invention relates to the use in lithium-ion batteries of ceramic or overwhelmingly ceramic separators filled with electrolyte comprising ionic liquids.

Lithium-ion batteries are energy storage systems having a very high energy density (up to 180 Wh/kg). These lithium-ion batteries are used in particular in the sector of portable electronics, as for example in laptops, camcorders or cellphones, also known as handhelds and mobiles. The negative electrode material here consists in particular of graphitic carbon, conductivity carbon black and a suitable binder material. This "graphite electrode" is used because of its stable cycling properties and its—compared with lithium metal (which is used in so-called "lithium-metal batteries")—fairly high handling safety, even though graphitic carbon has a very low potential of about 100 to 200 mV vs. $Li/Li^+$. When the lithium-ion battery is charged, lithium ions intercalate in the graphitic carbon, the lithium ions being reduced in the process by electron uptake. This process takes place in reverse at discharge. The positive electrode material used is mostly lithium transition metal oxides, such as for example $LiCoO_2$, $LiNiO_2$ or $LiMn_xNi_yCo_{1-x-y}O_2$, which have a high potential (3.8-4.2 V vs. $Li/Li^+$).

One of the reasons for the high energy density of lithium-ion batteries is the high potential window due to the electrode combination, which can be up to 4 V. This high potential difference is very demanding of the electrolyte materials used, in that for example a combination of a polar liquid with a lithium salt is used as an electrolyte in which the lithium salt performs the ion conduction function. Under the given conditions in a lithium-ion battery, prior art electrolytes are generally not durably stable, since not only the electrolyte liquid but also the lithium conducting salt can be reduced at the negative electrode. Lithium-ion batteries are industrially useful by virtue of the fact that an important constituent of conventional electrolytes, for example ethylene carbonate, forms a solid electrolyte interphase film on the surface of the graphite in the course of the reduction at the negative electrode, this film allowing ion conduction but preventing any further reduction of the electrolyte.

Conventional electrolytes are electrolytes based on carbonates, such as for example ethylene carbonate (EC), dimethyl carbonate (DMC), diethyl carbonate (DEC), propylene carbonate (PC) or lactones, such as for example γ-butyrolactone (γ-BL). Ethylene carbonate, which is a solid at room temperature, is generally used in the form of a mixture with low-viscosity solvents, such as dimethyl carbonate or ethyl methyl carbonate (EMC), to increase the conductivity.

There have been recent attempts to replace the relatively speaking highly flammable carbonate electrolytes at least to some extent with less flammable electrolytes in order that the safety of lithium-ion batteries may be enhanced.

Blomgren et al. describe the use of ionic liquids as electrolyte materials in the lithium-ion battery (A. Webber, G. E. Blomgren, Advances in Lithium-Ion Batteries (2002), 185-232; G. E. Blomgren, J. Power Sources 2003, 119-121, 326-329)

Covalent Associates in WO 01/93363 describe a non-flammable electrolyte consisting of a salt having an organic cation or of an ionic liquid (IL), an organic solvent, an acrylate polymer or fluoropolymer, and a conducting salt.

Yuasa Corporation in JP 2002373704 describes a non-aqueous electrolyte consisting of a salt molten at room temperature, a lithium salt and a cyclic ester having a π bond.

Mitsubishi Chemicals Industries Ltd. in JP 11307121 describes an electrolyte consisting of an ionic liquid based on quaternary imidazolium or pyridinium ions and from 1% to 130% by volume of an organic cyclic compound.

Ionic liquids (ILs) have so far failed to become established for use as solvents in the electrolyte of a battery, despite many attempts to push them. An essential reason for this is believed to be that the use of ionic liquids as solvents in the electrolyte of lithium-ion batteries is disadvantageous because of poor wettability with regard to conventional separators.

The present invention therefore had for its object to provide a system where ionic liquids (ILs) can be used as a constituent on the electrolyte and which shall have comparable wettability properties to conventional carbonate electrolytes.

One of the reasons for the poor wettability of conventional separators by electrolytes based on ionic liquids as solvents is that conventional separators in the lithium battery are based on hydrophobic materials, such as PE and/or PP for example. These are virtually unwettable by the polar ionic liquids.

The poor wettability with regard to conventional separators means not only that it can take a relatively long time until the wound battery can be filled with electrolyte, but also that the distribution of the electrolyte in the cell is uneven (because there are for example air bubbles or unfilled pores left in the separator), and this can lead to poor long-term stability for the battery. Another consequence of poor wettability is that battery load capacity turns very bad, i.e., maximum charging/discharging currents are relatively low.

It is now been found that, surprisingly, the object is achieved when separators consisting of ceramic or having surfaces of ceramic are used in combination with electrolytes comprising ionic liquids. Owing to the ceramic nature of the separators (at the surfaces of the separator at least), they are extremely hydrophilic and hence very readily wettable by polar electrolytes comprising ionic liquids.

Ceramic separators comprising ceramic material applied to a carrier, a polymeric fibrous nonwoven for example, for use in lithium batteries based on conventional electrolytes are known from the prior art, for example from WO 03/021697, WO 03/072231, WO 03/073534, WO 2004/021469, WO 2004/021474, WO 2004/021475, WO 2004/021476, WO 2004/021477 and WO 2004/021499.

The present invention accordingly provides for the use of a ceramic separator or a separator which has a ceramic surface, in particular the use of a separator which comprises a sheetlike flexible substrate which has a multiplicity of openings and a coating present on and in this substrate, the material of the substrate being selected from woven or non-woven non-electroconductive natural or polymeric fibers and the coating being a porous electroinsulating ceramic coating, in a battery, the separator in the battery being filled with an electrolyte composition comprising a conducting salt and a base component, the main constituent of the base component, at a fraction of greater than 50% by mass, being at least one ionic liquid having a melting point of less than 100° C.

The present invention further provides an electrolyte-filled separator comprising a sheetlike flexible substrate which has a multiplicity of openings and a coating present on and in this substrate, the material of the substrate being selected from woven or non-woven nonelectroconductive natural or polymeric fibers and the coating being a porous electroinsulating ceramic coating, the separator being filled with an electrolyte composition, characterized in that the electrolyte composition comprises a conducting salt and a base component, the main constituent of the base component, at a fraction of greater than 50% by mass, being at least one ionic liquid having a melting point of less than 100° C.

The present invention likewise provides a process for producing a separator according to the present invention by steps including a sheetlike flexible substrate which has a multiplicity of openings being provided with a coating in and on this substrate by applying a suspension which comprises particles of at least one inorganic compound suspended in a sol to the substrate and by one or more heating operations to solidify the suspension on and in the carrier, characterized in that the separator thus prepared is impregnated with an electrolyte composition comprising a conducting salt and a base component, the main constituent of the base component, at a fraction of greater than 50% by mass, being at least one ionic liquid having a melting point of less than 100° C.

The present invention also provides for the use of a separator according to the present invention, especially of a separator as claimed in the claims, as a separator in batteries, especially in lithium-metal or lithium-ion batteries, and also a lithium-ion battery comprising a separator according to the present invention and especially a separator as claimed in the claims.

The present invention's system, comprising a partly ceramic separator and an electrolyte composition whose base component comprises more than 50% by mass of ionic liquid, has the advantage that if any only a small fraction of highly flammable components are present in the electrolyte. This enhances the safety of lithium-ion batteries equipped with the separator of the present invention.

Moreover, the separators of the present invention are themselves safer than conventional separators. Polymeric separators provide for example safety currently required for lithium batteries by suppressing any current transport through the electrolyte from a certain temperature (the shutdown temperature, which is about 120° C.). This happens because at this temperature the pore structure of the separator collapses and all pores are closed. As a result of the fact that ions can no longer be transported, the hazardous reaction which can lead to explosion ceases. But when the cell continues to be heated up because of external circumstances, the breakdown temperature will be exceeded at about 150 to 180° C. At the breakdown temperature, the separator melts and contracts. Direct contact then occurs between the two electrodes at many places in the battery cell and so an internal short circuit occurs over a large area. It leads to an uncontrolled reaction, which ends with the cell exploding, or the resulting pressure is released through an overpressure valve (a bursting disk), frequently with signs of fire.

The separator of the present invention, which comprises inorganic components and preferably a polymeric material as a substrate, will undergo shutdown when the high temperature causes the polymeric structure of the carrier material to melt and to penetrate into the pores of the inorganic material, thereby closing them. But meltdown does not occur with the separator of the present invention. The separator of the present invention thus meets the demands, voiced by various battery manufacturers, for a safety shutdown mechanism, by virtue of its shutdown mechanism in the battery cells. The inorganic particles ensure that there can never be a meltdown. It is thus ensured that there are no operating states where large-area short circuiting can occur.

If an additional shutdown mechanism is absolutely required for use, this can additionally be achieved by endowing the surface and/or the pores of the ceramic or hybridic separator of the present invention with a material which, on attainment of the temperature limit, closes the pores and prevents further ion flux. This can be achieved for example through an additional layer of a polymer or wax whose melting point is in the range 80-150° C.

The separator of the present invention is also very safe in the event of internal short circuiting due to an accident for example. If, for example, a nail were to puncture a battery, the following would happen, depending on the type of separator: a polymeric separator would melt at the site of puncture (a short circuit current flows through the nail and causes it to heat up) and contract. As a result, the short circuit location will become larger and larger and the reaction will get out of control. In the case of the hybridic separator of the present invention, only the polymeric substrate material would melt, but not the inorganic separator material. So the reaction in the interior of the battery cell following such an accident would proceed very much more moderately. This battery would thus be distinctly safer than one with a polymeric separator. This is an important factor in mobile applications in particular.

The system of the present invention also has the advantage that the open pores of the separator can be completely or at least almost completely filled with the electrolyte composition. This is attributable to the ceramic surface of the separator which, since it is hydrophilic, is very easily wettable by a polar liquid. The good wettability ensures that capillary forces are sufficient to suck the electrolyte composition into the pores of the separator. This is not the case with hydrophobic separators, such as polymeric separators for example.

The present invention's use of with ceramic separators or of separators comprising ceramic surfaces in combination with electrolyte compositions comprising ionic liquids and also separators filled with such electrolyte compositions and a process for producing these separators is described with reference to examples in what follows without the invention, the extent of protection conferred by which is defined by the description and the claims, being restricted to these embodiments.

The present invention's use of a ceramic separator, or a separator comprising a ceramic surface, especially the use of a separator comprising a sheetlike flexible substrate which has a multiplicity of openings and a coating present on and in this substrate, the material of the substrate being selected from woven or non-woven nonelectroconductive natural or polymeric fibers and the coating being a porous electroinsulating ceramic coating, in a battery, is characterized in that the separator in the battery is filled with an electrolyte composition comprising a conducting salt and a base component, the main constituent of the base component, at a fraction of greater than 50% by mass, being at least one ionic liquid having a melting point of less than 100° C. The battery can be in particular a lithium-metal or lithium-ion battery. Preference is given to using such separators as will hereinafter be described as inventive separators, separators of the present invention or separators according to the present invention.

The inventive separator, comprising a sheetlike flexible substrate which has a multiplicity of openings and a coating present on and in this substrate, the material of the substrate being selected from woven or non-woven nonelectroconductive fibers, preferably natural or polymeric fibers, and the coating being a porous electroinsulating ceramic coating, the separator being filled with an electrolyte composition, is characterized in that the electrolyte composition comprises a conducting salt and a base component, the main constituent of the base component, at a fraction of greater than 50% by mass, being at least one ionic liquid having a melting point of less than 100° C.

The separator not filled with electrolyte composition can itself be a prior art separator as described for example in the documents WO 03/021697, WO 03/072231, WO 03/073534, WO 2004/021469, WO 2004/021474, WO 2004/021475, WO 2004/021476, WO 2004/021477 and WO 2004/021499, each of which is expressly incorporated herein for the separator and its production process by reference.

The separator itself, being a flexible substrate, preferably comprises a nonwoven, the material of the substrate or nonwoven preferably being selected from non-woven nonelectroconductive polymeric fibers. It is particularly preferable for the substrate to comprise a flexible nonwoven having a basis weight of less than 20 g/m² and preferably in the range from 5 to 8 g/m².

The separator of the present invention preferably comprises a substrate less than 30 μm, preferably from 5 to 30 μm and more preferably from 10 to 18 μm in thickness. The substrate is preferably a nonwoven.

For a substrate to be particularly advantageous for use in a separator according to the present invention it should have a very homogeneous pore radius distribution. It is particularly preferable for the substrate to have a pore radius distribution where at least 50% of the pores have a pore radius in the range from 75 to 150 μm and preferably in the range from 80 to 120 μm. An even more homogeneous pore radius distribution in the nonwoven combined with optimally adjusted oxidic particles of a certain size leads to an optimized porosity for the separator of the present invention.

The porosity of the substrate, which is preferably a nonwoven, is preferably in the range from 50% to 97%, more preferably in the range from 60% to 90% and even more preferably in the range from 70% to 85%. Porosity here is defined as the volume of the substrate (100%) minus the volume of the fibers of the substrate, i.e., the substrate's volume fraction which is not occupied by material. The volume of the substrate can be calculated from the dimensions of the substrate. The volume of the fibers follows from the measured weight of the contemplated substrate and the density of the polymeric fibers. High substrate porosity ensures that the separator possesses sufficient porosity, and hence sufficient conductivity, after application of the porous inorganic or ceramic coating. Good conductivity is likewise ensured by the low thickness of the substrate used, which low thickness also makes it possible for the thickness of the separator to be minimized. Preferred substrates are nonwovens composed of polymeric fibers.

The substrate preferably comprises polymeric fibers selected from fibers of polyacrylonitrile (PAN), polyamides, polyimides, polyacrylates, polytetrafluoro-ethylene, polyesters, such as for example polyethylene terephthalate (PET) and/or polyolefin, such as for example polyethylene (PE) or polypropylene (PP) or mixtures of such polyolefins. The substrate may also comprise two or more different fibers of various polymers. This may be preferable, for example, when a portion of the fibers of the substrate have a relatively low melting point, such as for example polyethylene fibers, and a portion of the fibers have a relatively high melting point, such as for example polyacrylonitrile fibers. The polyethylene fibers will melt in the event of battery heating due to malfunction and so lead to shutdown, while the fibers which melt at a higher temperature continue to be able to ensure separator stability. It is particularly preferable for the substrate to comprise polymeric fibers 0.1 to 10 μm and preferably 1 to 4 μm in diameter.

The separators of the present invention are preferably less than 50 μm, more preferably less than 40 μm and even more preferably 15 to 30 μm in thickness. Substrate thickness has a considerable influence on separator properties, since not only the flexibility but also the sheet resistance of the electrolyte-drenched separator is dependent on substrate thickness. Low thickness provides a particularly low electrical resistance to the separator in use with an electrolyte.

The separator itself does of course have a very high electrical resistance, since it itself has to have insulating properties. In addition, thinner separators permit an increased packing density in a battery stack, so that a larger amount of energy can be stored in the same volume.

The separator of the present invention has a porous, electrically insulating, ceramic coating on and in the substrate. The coating present on and in the substrate preferably includes an oxide, nitride or carbide of the metals Al, Zr, Si, Sn, Ce and/or Y or consists of one or more of these compounds. The porous inorganic coating present on and in the substrate more preferably comprises oxidic particles of the elements Al, Si and/or Zr, preferably 0.1 to 7, more preferably 0.5 to 5 μm and most preferably 1.5 to 3 μm in average particle size. It is particularly preferable for the separator to comprise a porous inorganic coating on and in the substrate that comprises alumina particles 0.1 to 7 μm, preferably 0.5 to 5 μm and more preferably 1.5 to 3 μm in average particle size which are adhered together by an oxide of the elements Zr or Si. To achieve a very high porosity, it is preferable for more than 50% by weight and more preferable for more than 80% by weight of all particles to be within the abovementioned limits for the average particle size. The preferred maximum particle size is preferably less than ⅓, more preferably less than ⅕ and even more preferably not more than ¹⁄₁₀ of the thickness of the substrate used.

The porosity of the separator is preferably in the range from 30% to 80%, more preferably in the range from 40% to 75% and even more preferably in the range from 45% to 70%. Porosity here relates to accessible, i.e., open, pores. Porosity in this sense can be determined by the familiar method of mercury porosimetry or can be calculated from the volume and the density of the materials used on the assumption that open pores only are present.

The separators of the present invention can have a breaking strength of at least 1 N/cm, preferably of at least 3 N/cm and most preferably of 3 to 10 N/cm. The separators of the present invention are preferably bendable without damage down to any radius down to 100 m, preferably down to 50 mm and most preferably down to 1 mm. The high breaking strength and the good bendability of the separator according to the present invention has the advantage that the separator is able to accommodate without being damaged changes in electrode geometry which occur in the course of battery charging and discharging. Bendability also has the advantage that commercially standardized wound cells can be manufactured using this separator. In wound cells, the electrodes/separator plies are spirally wound up with each other in standardized size and contacted.

It may be advantageous for the separator to possess a noninherent shutdown mechanism. This noninherent shutdown mechanism may be achieved for example when a very thin layer of waxy or polymeric particles which melt at a desired shutdown temperature, so-called shutdown particles, is present on or in the separator. Particularly preferred materials for shutdown particles include for example natural or artificial waxes or low-melting polymers, such as polyolefins for example, the material for the shutdown particles being chosen such that the particles melt at the desired shutdown temperature, closing the pores of the separator to prevent further ion flux.

Preferably, the shutdown particles have an average particle size ($D_w$) which is not less than the average particle pore size ($d_s$) of the pores in the porous inorganic layer of the separator.

This is advantageous in particular because this prevents penetration and closing of the pores in the separator layer that will result in reduced pore volume and hence in reduced separator performance and also reduced battery performance. The thickness of the shutdown particle layer is only critical insofar as an excessively thick layer would unnecessarily increase the resistance in the battery system. To achieve secure shutdown, the shutdown particle layer should have a thickness ($z_w$) which is approximately in the range from the average particle size of the shutdown particle ($D_w$) up to $10 D_w$ and preferably in the range from $2 D_w$ to $D_w$. A thus equipped separator possesses a primary safety feature. In contrast to the all-organic separator materials, however, this separator cannot melt completely and there can never be a meltdown. These safety features are very important for high energy batteries owing to the very large energy quantities and therefore are frequently mandated.

In a further embodiment of the separator according to the present invention the shutdown mechanism can also be realized by there being, on the ceramic coating, a porous shutdown layer composed of a material which melts at a predetermined temperature and closes the pores in the ceramic layer, the shutdown layer being formed by a porous sheetlike structure selected from a woven, nonwoven, felt, loop-formingly knitted fabric or a porous foil, film or sheet. This shutdown layer is preferably 1 to 20 μm and more preferably 5 to 10 μm in thickness. The shutdown layer can consist of a material selected from polymers, polymer blends, natural or artificial waxes or mixtures thereof which each have a melting temperature of less than 130° C.

The electrolyte composition present in the separator, i.e., in the open pores of the separator, as well as at least one conducting salt, comprises at least one base component which preferably consists of ionic liquid to an extent of at least 75% by mass. It may be preferable for the base component to consist fully of ionic liquid.

Ionic liquids in the sense of this invention are salts which have a melting point of not more than 100° C. Ionic liquids are reviewed for example by Welton (Chem. Rev. 99 (1999), 2071) and Wasserscheid et al. (Angew. Chem. 112 (2000), 3926). The ionic liquids in the electrolyte composition are preferably such salts as have a melting point of below 750° C., preferably below 50° C., more preferably below 20° C. and more preferably below 0° C. The electrolyte compositions preferably comprise ionic liquids (A) which have organic cations. The electrolyte compositions present in the separator of the present invention preferably comprise ionic liquids (A) which have one cation or two or more cations as per the following structures:

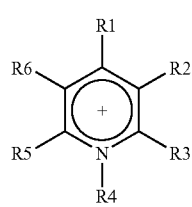

1

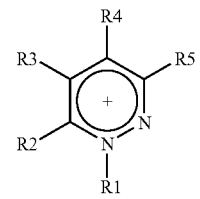

2

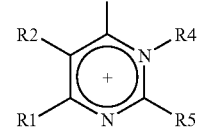

3

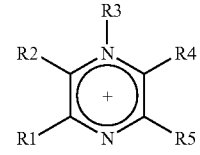

4

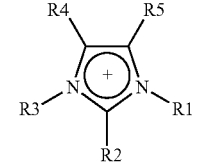

5

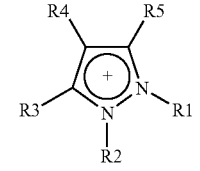

6

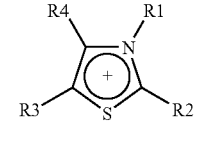

7

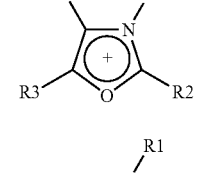

8

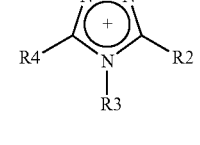

9

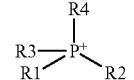

10

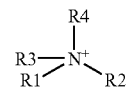

11

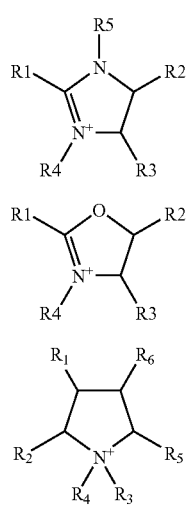

where R1, R2, R3, R4, R5 and R6, identically or differently, and
hydrogen, hydroxyl, alkoxy, sulfanyl (R—S—), $NH_2$—, NHR—, NRR'— group, wherein R and R' can be identical or different, substituted or unsubstituted alkyl groups having 1 to 8 carbon atoms, or halogen, especially F, Cl, Br or I, although for cations of the structure 10 and 11 one of R1 to R4, preferably all of R1 to R4, are preferably not hydrogen, a linear or branched aliphatic hydrocarbon radical having 1 to 20, preferably 1 to 8 and more preferably 1 to 4 carbon atoms, which may be substituted, for example with a hydroxyl, alkyl having 1 to 8 and preferably 1 to 4 carbon atoms and/or halogen group, or unsubstituted,
a cycloaliphatic hydrocarbon radical having 5 to 30, preferably 5 to 10 and more preferably 5 to 8 carbon atoms, which may be substituted, for example with a hydroxyl, alkyl having 1 to 8 and preferably 1 to 4 carbon atoms and/or halogen group, or unsubstituted, an aromatic hydrocarbon radical having 6 to 30, preferably 6 to 12 and more preferably 6 to 10 carbon atoms, which may be substituted, for example with a hydroxyl, alkyl having 1 to 8 and preferably 1 to 4 carbon atoms and/or halogen group, or unsubstituted, an alkylaryl radical having 7 to 40, preferably 7 to 14 and more preferably 7 to 12 carbon atoms, which may be substituted, for example with a hydroxyl, alkyl having 1 to 8 and preferably 1 to 4 carbon atoms and/or halogen group, or unsubstituted,
a linear or branched aliphatic hydrocarbon radical which is interrupted by one or more heteroatoms (oxygen, NH, $NCH_3$) and has 2 to 20 carbon atoms, which may be substituted, for example with a hydroxyl, alkyl having 1 to 8 and preferably 1 to 4 carbon atoms and/or halogen group, or unsubstituted,
a linear or branched aliphatic hydrocarbon radical which is interrupted by one or more functionalities selected from the group —O—C(O)—, —(O)C—O—, —NH—C(O)—, —(O)C—NH, —($CH_3$)N—C(O)—, —(O)C—N($CH_3$)—, —$S(O)_2$—O—, —O—$S(O)_2$—, —$S(O)_2$—NH—, —NH—$S(O)_2$—, —$S(O)_2$—N($CH_3$)—, —N($CH_3$)—$S(O)_2$—, and has 2 to 20 carbon atoms, which may be substituted, for example with a hydroxyl, alkyl having 1 to 8 and preferably 1 to 4 carbon atoms and/or halogen group, or unsubstituted,
a terminally HO—, $H_2N$—, $H_3CN(H)$-functionalized linear or branched aliphatic hydrocarbon radical having 1 to 20 carbon atoms, which may be substituted, for example with a hydroxyl, alkyl having 1 to 8 and preferably 1 to 4 carbon atoms and/or halogen group, or unsubstituted.

The electrolyte composition of the present invention preferably comprises at least one ionic liquid (A) having a cation based on ammonium, pyridinium, pyrrolidinium, pyrrolinium, oxazolium, oxazolinium, imidazolium, thiazolium or phosphonium ions.

The ionic liquids (A) included in the electrolyte composition preferably have one or more anions selected from phosphates, halophosphates, especially hexafluorophosphate, alkylphosphates, arylphosphates, nitrate, sulfate, bisulfate, alkylsulfates, arylsulfates, perfluorinated alkyl- and arylsulfates, sulfonate, alkylsulfonates, arylsulfonates, perfluorinated alkyl- and arylsulfonates, especially trifluoromethylsulfonate, tosylate, perchlorate, tetrachloroaluminate, heptachlorodialuminate, tetrafluoroborate, alkylborates, arylborates, amides, especially perfluorinated amides, dicyanamide, saccharinate, thiocyanate, carboxylates, especially acetates, preferably trifluoroacetate, and bis(perfluoroalkylsulfonyl)amide anions.

In a particularly preferred embodiment of the electrolyte composition, the electrolyte composition preferably comprises ionic liquids (A) with at least one salt where the cation is an imidazolium, a pyridinium, an ammonium or phosphonium ion having the following structures:

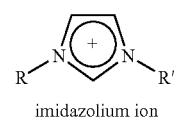

imidazolium ion

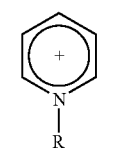

pyridinium ion

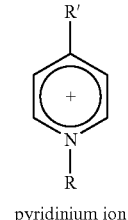

pyridinium ion

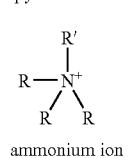

ammonium ion

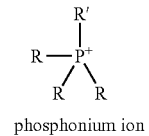

phosphonium ion where R and R' may be identical or different, substituted, for example with a hydroxyl, alkyl having 1 to 8, and preferably 1 to 4 carbon atoms and/or halogen group, or unsubstituted alkyl, preferably an alkyl group having 1 to 8 carbon atoms, or aryl groups, preferably an aryl group having 6 to 12 carbon atoms, R and R' preferably having different meanings, and where the anion is selected from tetrafluoroborate, alkylborate, especially triethylhexylborate, arylborate, halophosphate, especially hexafluorophosphate, nitrate, sulfonates, especially perfluorinated alkyl- and arylsulfonates, bisulfate, alkylsulfates, especially perfluorinated alkyl- and arylsulfates, thiocyanates, perfluorinated amides, dicyanamide and/or bis(perfluoroalkylsulfonyl)amide and especially bis(trifluoromethanesulfonyl)amide (($CF_3SO_2$)$_2$N).

The electrolyte composition of the present invention preferably comprises ionic liquids (A) selected from 1-ethyl-3-methylimidazolium bis(trifluoromethane-sulfonyl)imide, 1-ethyl-3-methylimidazolium tetrafluoroborate, 1-ethyl-3-methylimidazolium dicyanamide, 1-ethyl-3-methylimidazolium ethylsulfate, 1-butyl-3-methylimidazolium bis(trifluoromethanesulfonyl)imide, 1-butyl-2,3-dimethylimidazolium dicyanamide and/or methyltrioctylammonium bis(trifluoromethanesulfonyl)-imide.

The table below recites by way of example the melting points of some ionic liquids useful as an ionic liquid in the electrolyte composition of the separator according to the present invention. The salts may be prepared as per Welton (Chem. Rev. 1999, 99, 2071) and Wasserscheid et al. (Angew. Chem. 2000, 112, 3026-3945), or as per the references cited therein.

| Salt or ionic liquid | Melting point/° C. |
| --- | --- |
| [EMIM]$CF_3SO_3$ | −9 |
| [BMIM]$CF_3SO_3$ | 16 |
| [Ph$_3$Poc]Ots | 70-71 |
| [Bu3NMe]Ots | 62 |
| [BMIM]Cl | 65-69 |
| [EMIM]Cl | 87 |
| [EMIM]$NO_2$ | 87 |
| [EMIM]$NO_3$ | 55 |
| [EMIM]$AlCl_4$ | 38 |
| [EMIM]$BF_4$ | 7 |
| [EMIM]$CF_3CO_2$ | −14 |
| [EMIM][($CF_3SO_2$)$_2$N] | −3 |

The abbreviations used having the following meanings:
EMIM = 1-ethyl-3-methylimidazolium ion,
BMIM = 1-n-butyl-3-methylimidazolium ion,
Ts = $H_3CC_6H_4SO_2$ (tosyl),
Os = octyl,
Et = ethyl,
Me = methyl,
Bu = n-butyl,
$CF_3SO_3$ = triflate ion and
Ph = phenyl.

The abbreviations used having the following meanings: EMIM=1-ethyl-3-methylimidazolium ion, BMIM=1-n-butyl-3-methylimidazolium ion, Ts=$H_3CC_6H_4SO_2$ (tosyl), Oc=octyl, Et=ethyl, Me=methyl, Bu=n-butyl, $CF_3SO_3$=triflate ion and Ph=phenyl.

It is easy to see that, by using alkyl groups having a greater number of carbon atoms as R and/or R' in the imidazolium, pyridinium, ammonium or phosphonium ion, the melting point of the salts can be lowered, assuming that the same anions are used.

In a particular embodiment of the electrolyte composition according to the present invention this electrolyte composition comprises at least one ionic liquid (A) having a cation based on an ammonium, preferably tetraalkylammonium and more preferably trimethylalkylammonium and/or triethylalkylammonium.

The electrolyte composition of the present invention may also comprise a mixture of at least two different ionic liquids (A). If this is the case, the electrolyte composition of the present invention may comprise at least two different anions and/or two different cations based on the ionic liquid (A).

The ionic liquid (A) is present in the base component of the electrolyte composition at a level which is preferably in the range from 80% to 99.5% by weight, more preferably in the range from 90% to 99% by weight, even more preferably in the range from 92% to 98% by weight and most preferably in the range from 94% to 97% by weight, based on the sum total of all constituents of the base component.

Depending on the melting point of the salts or ionic liquids and on the composition of the electrolyte composition or of the base component, the ionic liquids will be present in the separator of the present invention at room temperature as a liquid or as a solidified liquid, i.e., as a solid.

The conducting salt (D) in the electrolyte composition present in the separator of the present invention is preferably a lithium compound and more preferably $LiPF_6$, $LiClO_4$, $LiAsF_6$, $LiBF_4$, $LiCF_3SO_3$, $LiN(CF_3SO_2)_2$, $LiN(SO_2CF_2CF_3)_2$, $LiSbF_6$, $LiAlCl_4$, $LiGaCl_4$, LiCl, $LiNO_3$, LiSCN, $LiO_3SCF_2CF_3$, $LiC_6F_5SO_3$, $LiO_2CCF_3$, $LiFSO_3$, $LiB(C_6H_5)_4$, $LiB(C_2O_4)_2$ and/or $Li(NTf_2)$. The concentration of conducting salt in the electrolyte composition of the present invention is preferably in the range from 0.25 mol/kg to the solubility limit of the conducting salt in the base component, preferably in the range from 0.25 to 0.75 mol/kg and more preferably 0.5 mol/kg based on the base component.

The electrolyte composition present in the separator of the present invention may comprise a film former (B) as further constituents of the base component. This film former (B) is preferably an organic compound and may preferably be an organic carbonate compound and more preferably vinylene carbonate. The film former in the base component may similarly be a compound selected from ethylene sulfite, (meth) acrylonitrile, halogenated ethylene carbonate, especially chloroethylene carbonate, lithium-borato complexes, especially lithium bis(oxalato)borate or lithium bis(biphenylato) borate, maleic anhydride, pyridine, dimethylacetamide, aniline, pyrrole or derivatives of these compounds.

A particular embodiment of the electrolyte composition has the base component including a film former (B) comprising a functionalized ionic liquid having organic cations as per at least one of the structures 1 to 14, wherein at least one of the substituents R1, R2, R3, R4, R5 and R6 has a multiple bond and preferably a double bond.

The amount of film former (B) in the base component is preferably in the range from 0.5% to 10% by weight, more preferably in the range from 2% to 8% by weight and even more preferably in the range from 3% to 6% by weight.

The base component may comprise a viscosity modifier (C) as a further constituent. The viscosity modifier may be an organic aprotic solvent, preferably a carbonate, a flame retardant selected from chlorinated or brominated hydrocarbons, from halogenated or alkyl- or aryl-substituted phosphanes, phosphates, phosphonates, phosphonites and phosphites or be an ionic liquid. When both the viscosity modifier and the film former are an ionic liquid, the entire base component may consist exclusively of ionic liquids. This makes it possible to obtain an inventive electrolyte composition which includes no or almost no volatile components. In general, the use of the viscosity modifier (C) in the electrolyte composition of the present invention is dependent on the ionic liquid (A) used and serves to optimize the viscosity of the electrolyte composition of the present invention, preferably by lowering it. The viscosity modifier content of the electrolyte composition of the present invention is preferably in the range from 0% to 10% by weight and more preferably in the range from 0% to 3% by weight.

In a particularly preferred embodiment of the separator according to the present invention, it comprises an electrolyte composition comprising a base component consisting of

- 80 to 99.5 parts by mass, preferably 90 to 99 parts by mass, more preferably 92 to 98 parts by mass and most preferably 94 to 97 parts by mass, of at least one ionic liquid (A) which has a melting point of less than 100° C.,
- 0.5 to 20 parts by mass, preferably 1 to 10 parts by mass, more preferably 2 to 8 parts by mass and most preferably 3 to 6 parts by mass, of a film former (B) and
- 0 to 19.5 parts by mass, preferably 0 to 9 parts by mass, more preferably 0 to 6 parts by mass, even more preferably 0 to 3 and most preferably 1 to 2 parts by mass, of a viscosity modifier (C) and a conducting salt (D),
the fraction of conducting salt (D) in the electrolyte composition being in the range from 0.25 mol/kg up to the solubility limit of the conducting salt in the base component, based on the base component.

The separator of the present invention is preferably obtainable by the present invention's process for producing a separator according to the present invention by initially a sheetlike flexible substrate which has a multiplicity of openings being provided with a coating in and on this substrate by applying a suspension which comprises particles of at least one inorganic compound suspended in a sol to the substrate and by one or more heating operations to solidify the suspension on and in the carrier, characterized in that the separator thus prepared is impregnated with an electrolyte composition comprising a conducting salt and a base component, the main constituent of the base component, at a fraction of greater than 50% by mass, being at least one ionic liquid having a melting point of less than 100° C. Impregnating the separator with the electrolyte composition refers to filling the open (accessible) pores of the separator with the electrolyte composition. Electrolyte compositions used are those already mentioned in the course of the description of the separator.

The impregnating of the separator with the electrolyte composition can take place at room temperature or at elevated temperature. Impregnating is preferably done at room temperature, at which the ionic liquid is present as a liquid. In the specific embodiment the impregnating is carried out at a temperature in the range from 50 to 100° C. The impregnating (filling) of the separator with the electrolyte composition can be effected before or after the incorporation/installation of the separator in the battery. Preferably the separator is initially installed in a battery and subsequently the battery is filled with the electrolyte composition, whereby the separator is impregnated with the electrolyte composition. The impregnating of the separator is effected in general after the battery cells have been produced in the form of coils or stacks of electrodes which are mechanically separated by the separators. The simplest way of doing it is for the housing which contains the coil or stack to be evacuated and then filled with electrolyte.

The separators used in the process according to the present invention and not as yet filled with an electrolyte composition can be produced for example as described in the documents WO 03/021697, WO 03/072231, WO 03/073534, WO 2004/021469, WO 2004/021474, WO 2004/021475, WO 2004/021476, WO 2004/021477 and WO 2004/021499. These documents are hereby expressly incorporated herein by reference for the process for producing the unfilled separator. As well as producing the separators, however, it is also possible to use commercially available separators as marketed for example by Creavis Gesellschaft für Technologie und Innovation, Marl, Germany, under the product designation of SEPARION®.

The production of an unfilled separator useful in the process of the present invention will now be described by way of example without the invention being restricted to the use of such separators.

A possible embodiment of the process for producing an initially unfilled separator has a flexible substrate, which is preferably less than 30 µm in thickness, more than 50% and preferably 50 to 97% in porosity and in possession of a pore radius distribution where at least 50% of the pores have a pore radius in the range from 75 to 150 µm, has a porous inorganic coating brought into and onto it by application of a suspension and at least one heating operation to solidify the suspension on and in the substrate, the suspension comprising particles of an inorganic compound suspended in at least one sol and the material for the substrate being selected from woven or nonwoven nonelectroconductive natural or polymeric fibers. It is particularly preferable for the substrate to comprise nonwoven polymeric fibers. It is very particularly preferable for the substrate to be a nonwoven. The particles of an inorganic compound present in the suspension are preferably an oxide, nitride or carbide of the metals Al, Zr, Si, Sn, Ce and/or Y. It is particularly preferable for the suspension to comprise metal oxide particles having an average particle diameter in the range from 0.5 to 7 µm, preferably in the range from 1 to 5 µm and most preferably in the range from 1.5 to 3 µm, of the metals Al, Zr and/or Si suspended in a sol.

The process itself is known in principle from WO 99/15262, but not all the parameters and materials used, especially the nonelectroconductive materials used, can be put to good use in the production of the separator of the present invention. Especially the particles used to produce the dispersion and also the nonwovens used as a substrate differ distinctly from the input materials described there.

The suspension can be brought onto and into the substrate, for example, by printing, pressing, compressing in, rolling on, knifecoating on, spreadcoating on, dipping, spraying or pouring on.

The substrate used is preferably less than 30 µm, more preferably less than 20 µm and even more preferably 7.5 to 15 µm in thickness. It is particularly preferable to use substrates as described in the course of the description of the separator according to the present invention.

The substrate used preferably comprises polymeric fibers as described in the course of the description of the separator according to the present invention. Particularly preferred substrates comprise polymeric fibers selected from polyacrylonitrile, polyesters, such as for example polyethylene terephthalate, and/or polyolefins. But all other known polymeric fibers can be used as well, provided they have the thermal stability required to produce the separators and are stable under the operating conditions in the lithium battery. The substrate used preferably comprises polymeric fibers having a softening temperature of more than 100° C. and a melting temperature of more than 110° C. It may be preferable for the polymeric fibers to be from 0.1 to 10 µm and preferably 1 to 5 µm in diameter.

The suspension used for producing the coating comprises at least one sol of the elements Al, Zr and/or Si, and is produced by suspending particles of the inorganic compound, preferably the oxides, in at least one of these sols. The sols are obtainable by hydrolyzing at least one compound with water or an acid or a combination of these compounds. It may be preferable for the compound to be hydrolyzed to be introduced into alcohol or an acid or a combination of these liquids prior to hydrolysis. The compound to be hydrolyzed is preferably at least one nitrate, one chloride, one carbonate, one alkoxide of the elements Al, Zr and/or Si. The hydrolysis is preferably carried out in the presence of liquid water, water vapor, ice or an acid or a combination of these compounds.

In one version of the process according to the present invention particulate sols are produced by hydrolysis of the compounds to be hydrolyzed. These particulate sols are so called because the compounds formed by hydrolysis in the sol are present in particulate form. Particulate forms can be produced as described above or in WO 99/15262. These sols customarily have a very high water content, which is preferably greater than 50% by weight. It may be preferable for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture of these acids. The particulate sols thus produced can subsequently be used to produce suspensions, in which case it is preferable to produce suspensions for application to polymeric fiber nonwovens which have been pretreated with polymeric sol.

In a further version of the process according to the present invention polymeric sols are produced by hydrolysis of the compounds to be hydrolyzed. In this preferred version of the process according to the present invention the sol has an acid and/or water content of less than 50% by weight. These polymeric sols are so called because the compounds formed by hydrolysis in the sol are present in polymeric form, i.e., in the form of chains crosslinked across a relatively large space. The polymeric sols customarily contain less than 50% by weight and preferably very much less than 20% by weight of water and/or aqueous acid. To obtain the preferred fraction of water and/or aqueous acid, the hydrolysis is preferably carried out such that the compound to be hydrolyzed is hydrolyzed with 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane for example. Compounds which are very quick to hydrolyze, such as zirconium tetraethoxide, may well form particulate sols under these conditions, for which reason 0.5 times the amount of liquid water is preferably used to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable.

To produce sols having a desired very low fraction of water and/or acid in the sol, it may be preferable for the compound to be hydrolyzed to be dissolved in an organic solvent, especially ethanol, isopropanol, butanol, amyl alcohol, hexane, cyclohexane, ethyl acetate and/or mixtures of these compounds, before the actual hydrolysis is carried out. A sol thus produced can be used for producing the suspension of the present invention.

Both particulate sols (large water fraction, low solvent fraction) and polymeric sols (low water fraction, large solvent fraction) can be used as a sol in the present invention's process for producing the suspension. As well as sols obtainable as just described, it is in principle also possible to use commercially available sols, for example zirconium nitrate sol or silica sol. The process of producing separators by applying a suspension to, and solidifying it on, a carrier is known per se from DE 101 42 622 and in similar form from WO 99/15262, but not all the parameters and ingredients are applicable to the production of the membrane of the present invention. More particularly, the operation described in WO 99/15262 is in that form not fully applicable to polymeric nonwoven materials, since the very watery sol systems described therein frequently do not permit complete, in-depth wetting of the typically hydrophobic polymeric nonwovens, since most polymeric nonwovens are only poorly wetted by very watery sol systems, if at all. It has been determined that even the minutest unwetted areas in the nonwoven material can lead to membranes and separators being obtained that have defects and hence are inutile.

It has now been found that, surprisingly, a sol system or a suspension whose wetting behavior has been adapted to the polymers will completely drench through the nonwoven materials and so provide defect-free coatings. In the process of the present invention it is therefore preferable to adapt the wetting behavior of the sol or suspension. This is preferably accomplished by producing sols or suspensions, these sols comprising one or more alcohols, for example methanol, ethanol or propanol, or mixtures thereof, and/or aliphatic hydrocarbons. But other solvent mixtures are conceivable as well for addition to the sol or suspension in order that their crosslinking behavior may be adapted to the nonwoven used.

The mass fraction of the suspended inorganic component (metal oxide particles) in the suspension is preferably 1 to 100 times, more preferably 1 to 50 times and most preferably 1 to 10 times that of the sol used. It is particularly preferable for the metal oxide particles used for producing the suspension to be alumina particles which preferably have an average particle size in the range from 0.5 to 7 µm. Alumina particles in the range of the preferred particle sizes are available for example from Martinswerke under the designations MDS 6; DN 206, MZS 3 and MZS 1 and from Alcoa with the designations CL3000 SG, CT800 SG and HVA SG.

It has been determined that the use of commercially available metal oxide particles may in certain circumstances lead to unsatisfactory results, since the particle size distribution is frequently very large. It is therefore preferable to use metal oxide particles which were classified by a conventional process, for example wind sifting, centrifugation and hydroclassification. It is preferable for the metal oxide particles used to be a fraction where the oversize portion, which accounts for up to 10% of the total amount, was separated off by wet sieving. This disruptive oversize, which it is very difficult or impossible to comminute even by the typical processes of slip production such as, for example, grinding (ball mill, attritor mill, pestle mill), dispersing (Ultra Turrax, ultrasound), trituration or chopping, can consist for example of aggregates, hard agglomerates, grinding media attritus. The aforementioned measures ensure that the inorganic porous layer has a very uniform pore size distribution. This is accomplished in particular by using metal oxide particles having a maximum particle size of preferably less than 1/3, more preferably less than 1/5 and even more preferably not more than 1/10 of the thickness of the nonwoven used.

Table 1 below gives an overview of how the choice of the various aluminas affects the porosity and the resulting pore size of the respective porous inorganic coating. To determine these data, the corresponding slips (suspensions) were produced and dried and solidified as pure moldings at 200° C.

TABLE 1

Typical data of ceramics as a function of powder type used

| Al$_2$O$_3$ type | Porosity % | Average pore size/nm |
|---|---|---|
| AlCoA CL3000SG | 51.0 | 755 |
| AlCoA CT800SG | 53.1 | 820 |
| AlCoA HVA SG | 53.3 | 865 |
| AlCoA CL4400FG | 44.8 | 1015 |
| Martinsw. DN 206 | 42.9 | 1025 |
| Martinsw. MDS 6 | 40.8 | 605 |
| Martinsw. MZS 1 + Martinsw. MZS 3 = 1:1 | 47% | 445 |
| Martinsw. MZS 3 | 48% | 690 |

To improve the adhesion of the inorganic components to polymeric fibers as a substrate material, it may be preferable for the suspensions used to be admixed with adhesion promoters, for example organofunctional silanes. Useful adhesion promoters include in particular compounds selected from the octylsilanes, the vinylsilanes, the amine-functionalized silanes and/or the glycidyl-functionalized silanes, for example the Dynasilanes from Degussa. Particularly preferred adhesion promoters for polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The adhesion promoters accordingly have to be selected such that the solidification temperature is below the melting or softening point of the polymer used as a substrate and below its decomposition temperature.

Suspensions according to the present invention preferably include very much less than 25% by weight and more preferably less than 10% by weight of compounds capable of acting as adhesion promoters. The amount of adhesion promoter is optimal when the fibers and/or particles are coated with a monomolecular layer of adhesion promoter. The amount in grams of adhesion promoter required for this purpose can be obtained by multiplying the amount in g of the oxides or fibers used by the specific surface area of the materials in m$^2$g$^{-1}$ and then dividing by the specific surface area required by the adhesion promoter in m$^2$g$^{-1}$, the specific surface area required frequently being of the order of 300 to 400 m$^2$g$^{-1}$.

Table 2 below gives an illustrative overview of useful adhesion promoters based on organofunctional silicon compounds for typical nonwoven material polymers.

TABLE 2

| Polymer | Organofunctional type | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO. VTEO, VTMOEO |

TABLE 2-continued

| Polymer | Organofunctional type | Adhesion promoter |
|---|---|---|
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane The coatings of the present invention are produced in and on the substrate by solidifying the suspension in and on the substrate. According to the present invention, the suspension present on and in the substrate can be solidified by heating to temperatures in the range from 50 to 350° C. Since, when polymeric substrate materials are used, the maximum temperature is dictated by the substrate, the maximum temperature must be conformed accordingly. Thus, depending on the embodiment of the process according to the present invention, the suspension present on and in the substrate is solidified by heating to a temperature in the range from 100 to 350° C. and most preferably by heating to a temperature in the range from 110 to 280° C. It may be preferable for heating to take the form of 1 second to 60 minutes at a temperature in the range from 100 to 350° C. It is particularly preferable to solidify the suspension by heating to a temperature in the range from 110 to 300° C. and most preferably to a temperature in the range from 110 to 280° C. and preferably for 0.5 to 10 min.

The assembly may be heated according to the present invention using heated air, hot air, infrared radiation or by other heating methods according to the prior art.

The process of the present invention may be carried out for example by unwinding the substrate, for example a polymeric nonwoven, off a reel, passing it at a speed in the range from 1 m/h to 2 m/s, preferably at a speed in the range from 0.5 m/min to 20 m/min and most preferably at a speed in the range from 1 m/min to 5 m/min through at least one apparatus which transports the suspension onto and into the substrate, an example of such an apparatus being a roll, and through at least one further apparatus whereby the suspension is solidified on and in the substrate by heating, for example an electrically heated furnace, and winding the separator thus produced up on a second reel. This procedure makes it possible to produce the separator in a continuous process. Similarly, the pretreatment steps can be carried out on a continuous basis by complying with the parameters mentioned. Moreover, impregnation can be carried out as a continuous process, by providing one or more apparatuses suitable for impregnating the separator.

It will be particularly preferable to carry out the process by ensuring that the substrate, especially the polymeric nonwoven, has a maximum tension in the longitudinal direction of 10 N/cm and preferably of 3 N/cm during the coating operation or operations. "Coating operations" refers to all process steps in which a material is transported onto and into the substrate and solidified there by heat treatment, i.e., including the application of the adhesion promoter. The tension on the substrate during the coating operations is preferably not more than 0.01 N/cm. It may be particularly preferable for the substrate to be led tensionlessly in the longitudinal direction during the coating operation or operations.

By policing the pulling tension during coating, it is possible to avoid the carrier material undergoing any deformation including an elastic deformation. Possible deformation (stretching) due to excessive pulling tension can mean that the ceramic coating cannot follow the nonwoven material of construction, the consequence being that the coating will become detached from the nonwoven material over the entire area. The resulting product can then not be used for the intended purpose.

The separator of the present invention may be equipped with an additional automatic shutdown mechanism by, for example, applying a layer of particles which, at a desired temperature, melt and close the pores of the separator, so-called shutdown particles, to the separator after solidification of the applied suspension on the substrate to create a shutdown mechanism, and immobilizing the layer of shutdown particles. The layer of shutdown particles may be created for example by applying a suspension of waxy particles having an average particle size larger than the average pore size of the separator in a sol, water, solvent or solvent mixture.

The suspension for applying the particles comprises preferably from 1% to 50% by weight, more preferably from 5% to 40% by weight and most preferably from 10% to 30% by weight of shutdown particles, especially wax particles, in the suspension.

Since the inorganic coating of the separator frequently has a very hydrophilic character, it has been determined to be advantageous for the coating of the separator to be produced using a silane in a polymeric sol as an adhesion promoter and thus be hydrophobicized. To achieve good adhesion and uniform dissipation of the shutdown particles in the shutdown layer on hydrophilic as well as hydrophobic porous inorganic separator layers, there are several possibilities.

In one version of the process according to the present invention it has been determined to be advantageous to hydrophobicize the porous inorganic layer of the separator before the shutdown particles are applied. The production of hydrophobic membranes which works according to the same principle is described for example in WO 99/62624. Preferably, the porous inorganic coating is hydrophobicized by treatment with alkyl-, aryl- or fluoroalkylsilanes marketed for example by Degussa under the brand name of Dynasilane. It is possible in this context to employ for example the familiar hydrophobicization methods which are employed inter alia for textiles (D. Knittel; E. Schollmeyer; *Melliand Textilber.* (1998) 79(5), 362-363) with minimal changes to the recipes, for the porous coatings of the separator as well. To this end, the coating or separator is treated with a solution which includes at least one hydrophobic material. It may be preferable for the solvent in the solution to be water, preferably adjusted to a pH in the range from 1 to 3 with an acid, preferably acetic acid or hydrochloric acid, and/or an alcohol, preferably ethanol. The solvent fraction attributable to acid-treated water or to alcohol can be in each case in the range from 0% to 100% by volume. Preferably, the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to produce the solution. Useful hydrophobic materials include for example the silanes recited above. Surprisingly, good hydrophobicization is obtained not just with strongly hydrophobic compounds such as for example triethoxy(3,3,4,4,5,5,6,6,7,7,8,8-tridecafluorooctyl)silane, but treatment with methyltriethoxysilane or i-butyltriethoxysilane is completely sufficient to obtain the desired effect. The solutions are stirred at room temperature to achieve uniform dissipation of the hydrophobic materials in the solution and subsequently applied to the inorganic coating of the separator and dried. Drying can be speeded by treatment at temperatures in the range from 25 to 100° C.

In a further version of the process according to the present invention, the porous inorganic coating may also be treated with other adhesion promoters before the shutdown particles are applied. The treatment with one of the adhesion promoters mentioned hereinbelow may then likewise be effected as described above, i.e., by treating the porous inorganic layer with a polymeric sol which includes a silane adhesion promoter.

The layer of shutdown particles is preferably created by applying to the inorganic coating on the separator a suspension of shutdown particles in a suspension medium selected from the group consisting of a sol, water, solvents, for example alcohol, ethers or ketones, and a solvent mixture and subsequent drying. The particle size of the shutdown particles present in the suspension is arbitrary in principle. However, it is preferable for the suspension to include shutdown particles having an average particle size ($D_w$) of not less than and preferably greater than the average size of the pores of the porous inorganic layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension such that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are added, for example Aerosil 200, a fraction in the range from 0.1% to 10% by weight and preferably in the range from 0.5% to 50% by weight of silica, based on the suspension, will frequently be sufficient to achieve a sufficiently high viscosity for the suspension. The fraction of auxiliaries can in each case be determined by simple preliminary tests.

It may be preferable for the shutdown particle suspension used to contain adhesion promoters. Such a suspension with adhesion promoter can be applied directly to an inorganic layer of the separator even when this layer was not hydrophobicized beforehand. It will be appreciated that a suspension with adhesion promoter can also be applied to a hydrophobicized layer or to a separator layer which was produced using an adhesion promoter. Adhesion promoters useful in the shutdown particle suspension are preferably silanes having amino, vinyl or methacryloyl side groups. Such adhesion promoters include for example AMEO (3-aminopropyltriethoxysilane), MEMO (3-methacryloyl-oxypropyltrimethoxysilane), Silfin (vinylsilane+initiator+catalyst), VTEO (vinyltriethoxysilane) or VTMO (vinyltrimethoxysilane). Such silanes are available for example from Degussa as an aqueous solution under the designation Dynasilane 2926, 2907 or 2781. An adhesive promoter fraction of not more than 10% by weight has been determined to be sufficient for ensuring sufficient adhesion of the shutdown particles to the porous inorganic layer. Shutdown particle suspensions with adhesion promoter preferably contain 0.1% to 10% by weight, more preferably 1% to 75% by weight and most preferably 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of polypropylene or polyethylene wax.

The shutdown particle suspension may be applied to the porous inorganic layer of the separator by printing on, pressing on, rolling on, knifecoating on, spreadcoating on, dipping, spraying or pouring on. The shutdown layer is preferably obtained by drying the applied suspension at a temperature in the range from room temperature to 100° C. and preferably in the range from 40 to 60° C.

It may be preferable for the shutdown particles to be immobilized on the porous inorganic layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the shutdown particle suspension with subsequent drying and any heating to above the glass transition temperature can be carried out continuously or quasicontinuously. When the starting material used is a flexible separator it can again be unwound off a reel, passed through a coating, drying and, if appropriate, heating apparatus and then be reeled up again.

In one version of the process the shutdown layer is applied not in the form of particles but in the form of sheetlike structures, such as for example apertured foils, films or sheets, nonwovens, formed-loop knits or wovens. Such a sheetlike structure can be applied by processes known to one skilled in the art, for example by laminating. Useful materials for the sheetlike structure include those enumerated in connection with the shutdown particles.

The separator of the present invention, filled with an electrolyte composition comprising at least one ionic liquid or not filled with the electrolyte composition until installed in the battery, can be used as a separator in batteries. More particularly, the separator of the present invention can be used in a battery which is a lithium metal or a lithium-ion battery.

The separators of the present invention make it possible to obtain batteries, especially lithium metal and/or lithium-ion batteries, which comprise a separator according to the present invention. Such batteries can be in particular lithium high energy or lithium high power batteries.

Figure 2:
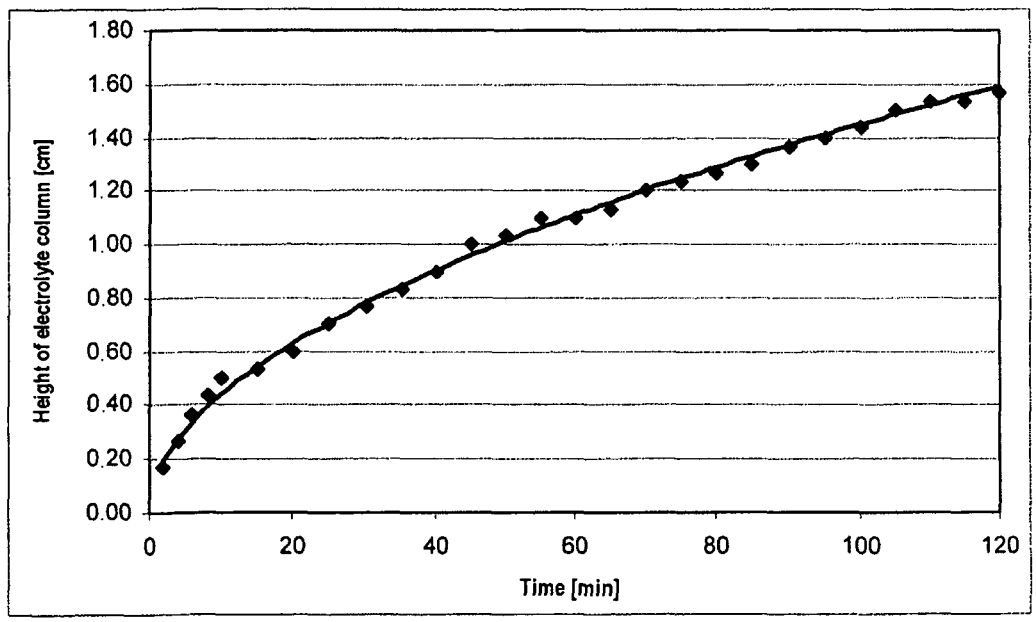
Figure 3:
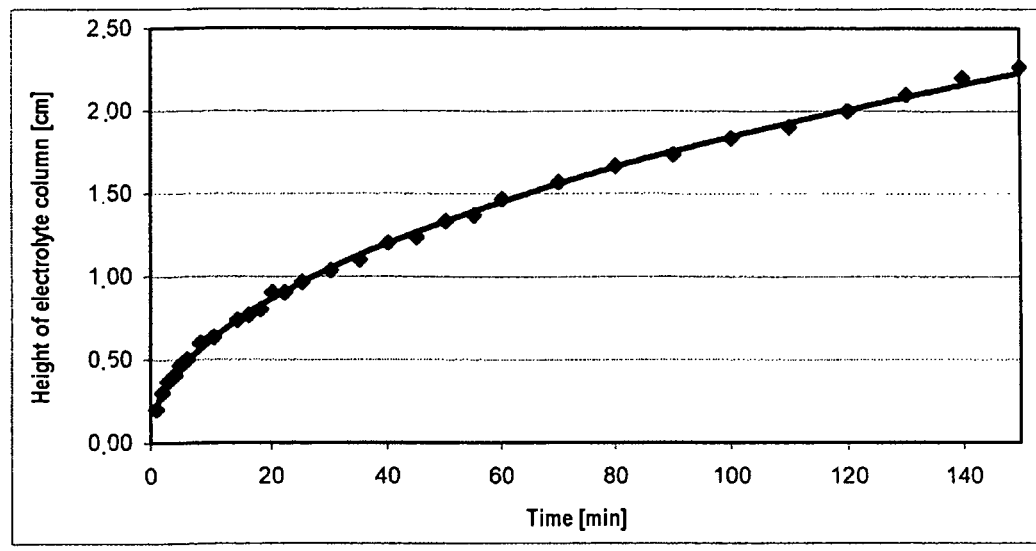
Figure 4:
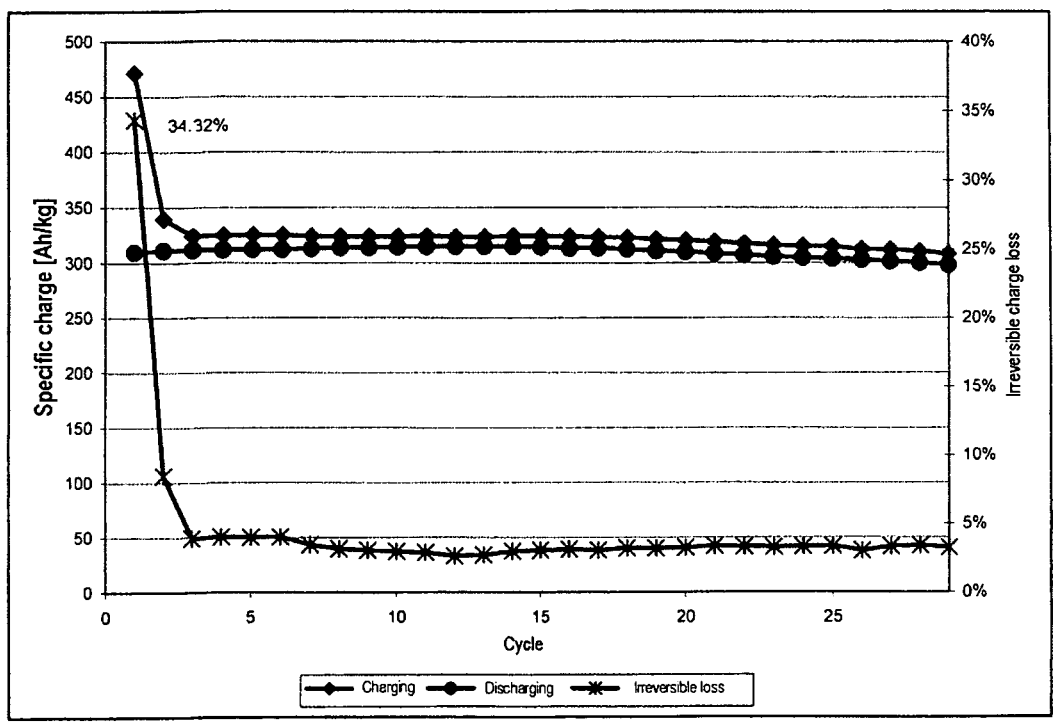

FIGS. 1 to 4 show various graphs which are intended to illustrate the invention without restricting the invention. FIGS. 1 to 3 reveal how high an ionic liquid is sucked into a separator within which time by capillary forces. FIG. 1 depicts two curves, the Separion curve indicating the wetting behavior of a ceramic separator according to the present invention and the PO separator curve indicating the wetting behavior of a conventional polyolefin separator. It is clearly visible in FIG. 1 that the ceramic separator is wetted more rapidly, and the height of rise is distinctly higher, than the PO separator. FIGS. 2 and 3 only indicate the wetting behavior curves for the ceramic separator, since the PO separator was not wetted at all by these ionic liquids. FIG. 4 shows the charging and discharging behavior of an electrochemical half cell comprising the separator of the present invention.

The separators of the present invention and their use will now be described by reference to examples without being restricted thereto.

EXAMPLE 1

Production of a SEPARION® S450P Ceramic Separator

To 160 g of ethanol were initially added 15 g of a 5% by weight aqueous $HNO_3$ solution, 10 g of tetraethoxysilane, 2.5 g of methyltriethoxysilane and 7.5 g of GLYMO Dynasilane (all Dynasilanes manufactured by Degussa AG). This sol, which was initially stirred for some hours, was then used to suspend 125 g each of Martoxid MZS-1 and Martoxid MZS-3 aluminas (both aluminas manufactured by Martinswerke). This slip was homogenized with a magnetic stirrer for at least a further 24 h, during which the stirred vessel had to be covered in order that no solvent loss may be incurred.

The above slip was then used to coat a PET nonwoven having a thickness of about 22 μm and a basis weight of about 15 g/m² in a continuous rollcoating process at a belt speed of about 8 m/h and T=220° C. In this rollcoating the slip was rolled on using a roll. The nonwoven subsequently passed through an oven 1 m in length at the stated temperature. The end result obtained was a separator having an average pore size of 450 nm and a thickness of about 35 μm. The Gurley number was about 10.

Determination of Gurley Number

The Gurley number was determined in the same apparatus as BP. However, the Gurley number was determined by determining the time t which a gas volume of 100 ml takes to pass through a 6.45 $Cm^2$ area under a 31 cm hydrohead gas pressure. The time t is the Gurley number.

Determination of the Bubble Point

The bubble point (BP) was measured by trimming the separator to a 30 mm diameter size. The trimmed separator was then immersed in the wetting liquid (completely ion-free water) for at least one day. The separator thus prepared was installed in an apparatus between a round sintered metal disc having a BP of about 0 bar (measurement without membrane), which serves as a support material, and a silicone rubber seal, the apparatus containing above the separator a vessel which was open at the top, which had the same cross section as the separator and which was filled with 2 cm of completely ion-free water and below the separator a second vessel which likewise had the same cross section as the separator and which was equipped with an inlet by which compressed air could be passed into the vessel by a pressure reduction valve. The separator was installed underneath the sintered metal disc, so that the sintered metal disc formed the bottom of the upper vessel and the separator sealed off the lower vessel. The pressure was then raised in the lower vessel in 0.1 bar increments at half minute intervals between each increase in pressure. After each increase in pressure, the water surface in the upper vessel was observed for about half a minute. As soon as the first small gas bubbles appear on the water surface, the BP pressure is reached and the measurement was discontinued.

EXAMPLE 2

Determination of Wetting Behavior of Rewoquat CPEM

To compare the wettability, wetting tests were carried out with Rewoquat CPEM (from Goldschmidt Rewo GmbH) as an ionic liquid. A commercially available PP/PE/PP separator (Celgard 2500) 25 μm in thickness is used as the reference material for the Example 1 ceramic separator of 35 μm thickness. A kind of thin layer chromatography was carried out. To this end, a strip of separator was placed in a glass beaker whose bottom was covered with 0.5 cm of the appropriate ionic liquid. The height of the solvent column in the electrolyte was then determined as a function of time.

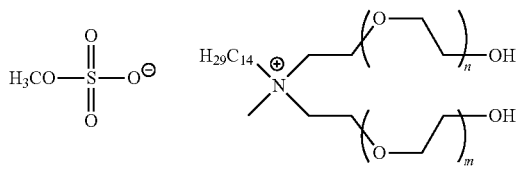

Structure of Rewoquat CPEM

As can be seen in FIG. 1, the wetting of the polyolefin separator is distinctly worse than that of the ceramic separator of example 1, i.e., the height of the rise after 3 h with the ceramic separator is greater, as is the wetting rate, distinctly, than in the case of the polyolefin separator.

EXAMPLE 3

Determination of Wetting Behavior of 1-ethyl-3-methylimidazolium bis(trifluoromethane-sulfonyl)amide To compare the wettability, wetting tests were carried out with 1-ethyl-3-methylimidazolium bis(trifluoro-methanesulfonyl)amide (prepared as per prior art: P. Bonhote, A.-P. Dias, N. Papageorgiou, K. Kalyanasundaram, M. Grätzel, Inorg. Chem. 1996, 35, 1168 or L. Cammata, S. Kazarian, P. Salter, T. Welton, Phys, Chem, Chem. Phys, 2001, 3, 5192). A commercially available PP/PE/PP separator (Celgard 2500) 25 μm in thickness is used as the reference material for the Example 1 ceramic separator of 35 μm thickness. A kind of thin layer chromatography was carried out as described in Example 2 using 1-ethyl-3-methylimidazolium bis(trifluoromethanesulfonyl)amide as an ionic liquid.

Wetting of the polyolefin separator with this ionic liquid was not observable. As the graph of FIG. 2 reveals, the ceramic separator is distinctly better wettable with this ionic liquid than that of Example 2.

EXAMPLE 4

Determination of Wetting Behavior of 2-ethyl-3-methyl-2-oxazolinium methylsulfate To compare wettability, wetting tests were carried out with 2-ethyl-3-methyl-2-oxazolinium methylsulfate (prepared as per the well-known reaction of 2-ethyloxazoline with dimethyl sulfate). A commercially available PP/PE/PP separator (Celgard 2500) 25 μm in thickness is used as the reference material for the Example 1 ceramic separator of 35 μm thickness. A kind of thin layer chromatography was carried out as in Example 2.

Again wetting of the polyolefin separator (PP/PE/PP separator) by this ionic liquid was not observed. As can be seen from the graph in FIG. 3, the ceramic separator is distinctly more wettable with 2-ethyl-3-methyl-2-oxalinium methylsulfate than with that of Example 2 or 3.

EXAMPLE 5

Half-Cell Test

The electrochemical cycling takes place in so-called half-cell arrangements. In the half-cell arrangement, the electrolyte composition of the present invention is measured in a sandwich arrangement of working electrode—separator/inventive electrolyte composition—counter/reference electrode. The working electrode (negative electrode) used is an electrode having an electrode material consisting of 90% by weight of commercially available SFG 44 graphite from TIMCAL, SA, Switzerland and 10% by weight of polyvinylidene fluoride (PVdF) binder. A partially lithiated $Li_4Ti_5O_{12}$ spinel, to which ionic liquids are stable, was used as counter/reference electrode (positive electrode), it has a potential of 1.56 V vs. $Li/Li^+$. The potential limits used are 0 and −1.55 V, which corresponds to 10 mV and 1.56 V vs. $Li/Li^+$. The cycling rate is reported in terms of current density per active mass of the electrode material. The value used for this is 10 mA/g of graphite for the first cycle and 50 mA/g of graphite for the following cycles. Charging and discharging is effected with a current reduction on reaching the voltage limit to below a value which corresponds to 5 mA/g. The use of this current reduction makes it possible to separate the performance of an electrode (fraction of current which flows in constant current mode, or galvanostatic fraction) from possible irreversible damage (which reduction in the entire capacity, including that flowing in the potentiostatic step) (see H. Buqa et al. in *ITE Battery Letters*, 4 (2003), 38).

The separator and the ionic liquid 1-ethyl-3-methylimidazolium bis(trifluoromethanesulfonyl)amide were used to produce half cells. First, a mixture of 95 g of IL 1-ethyl-3-methylimidazolium bis(trifluoro-methanesulfonyl)amide and 5 g of vinylene carbonate (VC) was used to prepare a 1 molar solution with $LiPF_6$ (electrolyte composition). Cells were then constructed using graphite as anode and Li titanate as cathode, a pure glass nonwoven being used as reference for the ceramic separators. The separator separates the electrodes from each other mechanically. After the cell was constructed it was filled with the electrolyte. The cells were then charged (formed) in the first cycle over 10 h and thereafter then charged/discharged with each cycle being 5 h. The cycling rate was 10 mA/g of graphite for the first cycle and 50 mA/g of graphite for the following cycles. FIG. 4 shows the cycling behavior.

The results with the glass nonwoven and the ceramic separator give the same results, here only results with the ceramic separator are reproduced (FIG. 4). In the first cycle, the irreversible loss is comparatively high, which, however, is attributable to the formation of the protective layer on the anode (SEI). In the following cycles, the irreversible loss is distinctly below 5%, as also in the comparative cell with the glass nonwoven separator. The cell runs very stable at about 320 Ah/kg, which approximately corresponds to the theoretical capacity of graphite, i.e., despite the comparatively high cycling rate the full capacity of the cell is achieved.

Cycling tests with PO separators do not provide satisfactory results under otherwise identical conditions.

The glass nonwoven separator used here in the test cells is out of the question for commercial applications, since at 100 to 200 μm it is much too thick for lithium batteries, because the energy density of the cells becomes too small as a result.

The invention claimed is:

1. A method comprising installing a separator in a battery, wherein the separator has a ceramic surface and which comprises a sheetlike flexible substrate which has a multiplicity of openings and a coating present on and in this substrate, the material of the substrate being selected from woven and nonwoven nonelectroconductive natural or polymeric fibers and the coating being a porous electroinsulating ceramic coating, the separator being filled with an electrolyte composition comprising a conducting salt and a base component, the main constituent of the base component, at a fraction of greater than 50% by mass, being at least one ionic liquid (A) having a melting point of less than 100° C., wherein the separator is filled with the electrolyte either before or after the separator is installed in the battery, and wherein the ionic liquid (A) comprises at least one salt selected from the following structures 1 to 14:

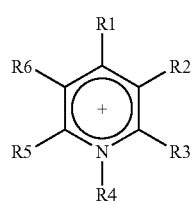
1

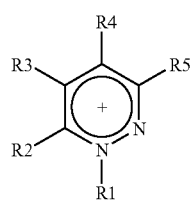
2

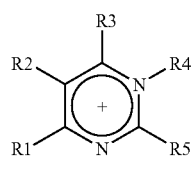
3

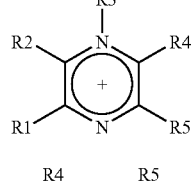
4

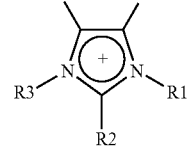
5

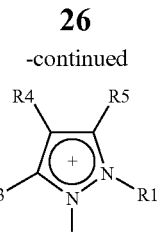
6

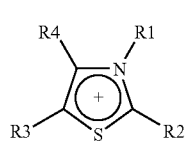
7

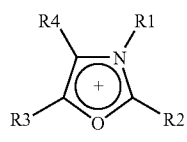
8

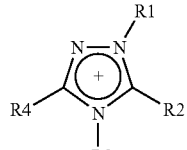
9

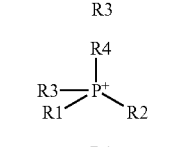
10

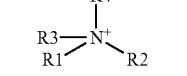
11

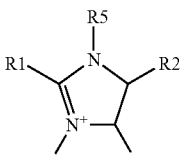
12

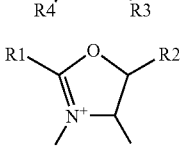
13

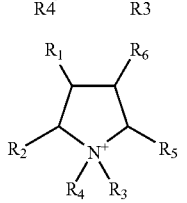
14 wherein R1, R2, R3, R4, R5 and R6, are identical or different, and are hydrogen, hydroxyl, alkoxy, sulfanyl (R—S—), $NH_2$—, NHR—, or NRR'— group, wherein R and R' can be identical or different, substituted or unsubstituted alkyl groups having 1 to 8 carbon atoms, or halogen, except that for cations of the structures 10 and 11, at least one of R1 to R4 is not hydrogen, and is a linear or branched aliphatic hydrocarbon radical having 1 to 20 carbon atoms, which may be substituted or unsubstituted, a cycloaliphatic hydrocarbon radical having 5 to 30 carbon atoms, which may be substituted or unsubstituted, an aromatic hydrocarbon radical having 6 to 30 carbon atoms, which may be substituted or unsubstituted, an alkylaryl radical having 7 to 40 carbon atoms, which may be substituted or unsubstituted, a linear or branched aliphatic hydrocarbon radical which is interrupted by one or more heteroatoms and has 2 to 20 carbon atoms, which may be substituted or unsubstituted, a linear or branched aliphatic hydrocarbon radical which is interrupted by one or more functionalities selected from the group —O—C(O)—, —(O)C—O—, —NH—C(O)—, —(O)C—NH, —(CH₃)N—C(O)—, —(O)C—N(CH₃)—, —S(O)₂—O—, —O—S(O)₂—, —S(O)₂—NH—, —NH—S(O)₂—, —S(O)₂—N(CH₃)—, —N(CH₃)—S(O)₂—, and has 2 to 20 carbon atoms, which may be substituted or unsubstituted, or a terminally HO—, H₂N—, H₃CN(H)-functionalized linear or branched aliphatic hydrocarbon radical having 1 to 20 carbon atoms, which may be substituted or unsubstituted;

and the base component additionally comprises a film former (B) comprising a functionalized ionic liquid having an organic cation selected from the organic cations of said structures 1 to 14, wherein at least one of substituents R1 to R6 has a multiple bond.

2. The method according to claim 1, wherein the battery is a lithium-metal or lithium-ion battery.

3. The method according to claim 1, wherein the substrate has a thickness of less than 30 µm, a porosity of more than 50% and a pore radius distribution where at least 50% of the pores have a pore radius in the range from 75 to 150 µm.

4. The method according to claim 1, wherein the polymeric fibers are 0.1 to 10 µm in diameter.

5. The method according to claim 1, wherein the substrate has a basis weight of less than 20 g/m².

6. The method according to claim 1, wherein the substrate is 5 to 30 µm in thickness.

7. The method according to claim 1, wherein the porosity of the substrate is in the range from 50% to 97%.

8. The method according to claim 1, wherein the coating present on and in the substrate comprises an oxide, nitride or carbide of the metals Al, Zr, Si, Sn, Ce and/or Y.

9. The method according to claim 1, wherein the porous ceramic coating present on and in the substrate comprises oxide particles of the elements Al, Si and/or Zr having an average particle size in the range from 0.1 to 7 µm.

10. The method according to claim 1, wherein the porous ceramic coating present on and in the substrate comprises alumina particles having an average particle size in the range from 0.5 to 5 µm which are adhered together by an oxide of the elements Zr or Si.

11. The method according to claim 1, wherein the separator is less than 50 µm in thickness.

12. The method according to claim 1, wherein the separator is bendable without damage down to a radius down to 100 mm.

13. The method according to claim 1, wherein the ceramic coating has disposed on it a porous shutdown layer of a material which melts at a predetermined temperature and closes the pores in the ceramic layer, the shutdown layer being formed by a porous sheetlike structure selected from a woven, nonwoven, felt, loop-formingly knitted fabric or a porous film, sheet or foil.

14. The method according to claim 13, wherein the shutdown layer is 1 to 20 µm in thickness.

15. The method according to claim 13, wherein the shutdown layer consists of a material selected from polymers, polymer blends, natural or artificial waxes or mixtures thereof, which has a melting temperature of less than 130° C.

16. The method according to claim 1, wherein the electrolyte composition comprises said base component consisting of 80 to 99.5 parts by mass of said at least one ionic liquid (A), 0.5 to 20 parts by mass of said film former (B) and 0 to 19 parts by mass of a viscosity modifier (C), and a conducting salt (D), the fraction of conducting salt (D) in the electrolyte composition being in the range from 0.25 mol/kg up to the solubility limit of the conducting salt in the base component, based on the base component.

17. The method according to claim 16, wherein at least one of the following applies:

the conducting salt (D) is a lithium compound, and the viscosity modifier (C) is present and is an organic aprotic solvent.

18. The method according to claim 1, wherein the fibers comprise polyethylene terephthalate (PET).

19. The process according to claim 1, wherein the flexible substrate of the separator is a nonwoven, the material of the nonwoven being selected from non-woven nonelectroconductive polymeric fibers.

20. The process according to claim 1, wherein the multiple bond is a double bond.

21. A process for producing a separator comprising providing a sheetlike flexible substrate which has a multiplicity of openings being provided with a coating in and on the substrate, applying a suspension which comprises particles of at least one inorganic compound suspended in a sol to the substrate and heating to solidify the suspension on and in the carrier, wherein the separator thus prepared is impregnated with an electrolyte composition comprising a conducting salt and a base component, the main constituent of the base component, at a fraction of greater than 50% by mass, being at least one ionic liquid (A) having a melting point of less than 100° C., wherein the material of the substrate is selected from woven and non-woven nonelectroconductive natural or polymeric fibers, wherein the ionic liquid (A) comprises at least one salt selected from the following structures 1 to 14:

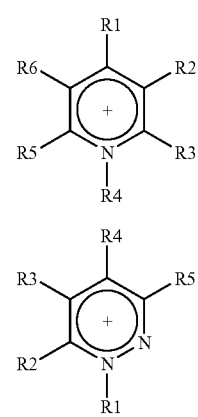

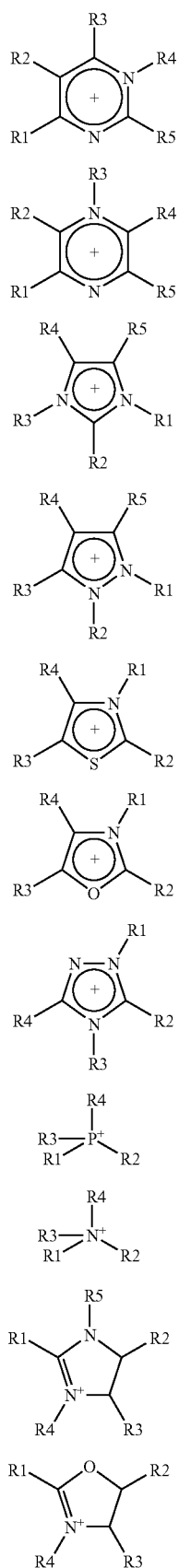

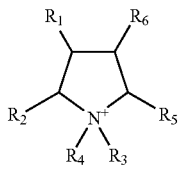

wherein R1, R2, R3, R4, R5 and R6, are identical or different, and are hydrogen, hydroxyl, alkoxy, sulfanyl (R—S—), $NH_2$—, NHR—, or NRR'— group, wherein R and R' can be identical or different, substituted or unsubstituted alkyl groups having 1 to 8 carbon atoms, or halogen, except that for cations of the structures 10 and 11, at least one of R1 to R4 is not hydrogen, and is a linear or branched aliphatic hydrocarbon radical having 1 to 20 carbon atoms, which may be substituted or unsubstituted, a cycloaliphatic hydrocarbon radical having 5 to 30 carbon atoms, which may be substituted or unsubstituted, an aromatic hydrocarbon radical having 6 to 30 carbon atoms, which may be substituted or unsubstituted, an alkylaryl radical having 7 to 40 carbon atoms, which may be substituted or unsubstituted, a linear or branched aliphatic hydrocarbon radical which is interrupted by one or more heteroatoms and has 2 to 20 carbon atoms, which may be substituted or unsubstituted, a linear or branched aliphatic hydrocarbon radical which is interrupted by one or more functionalities selected from the group —O—C(O)—, —(O)C—O—, —NH—C(O)—, —(O)C—NH, —($CH_3$)N—C(O)—, —(O)C—N($CH_3$)—, —S(O)$_2$—O—, —O—S(O)$_2$—, —S(O)$_2$—NH—, —NH—S(O)$_2$—, —S(O)$_2$—N($CH_3$)—, —N($CH_3$)—S(O)$_2$—, and has 2 to 20 carbon atoms, which may be substituted or unsubstituted, or a terminally HO—, $H_2N$—, $H_3$CN(H)-functionalized linear or branched aliphatic hydrocarbon radical having 1 to 20 carbon atoms, which may be substituted or unsubstituted;

and the base component additionally comprises a film former (B) comprising a functionalized ionic liquid having an organic cation selected from the organic cations of said structures 1 to 14, wherein at least one of substituents R1 to R6 has a multiple bond.

22. The process according to claim 21, wherein the impregnating step is carried out at room temperature.

23. The process according to claim 21, wherein the separator is initially installed in a battery and subsequently the battery is filled with electrolyte, whereby the separator is impregnated with the electrolyte composition.

24. The process according to claim 21, wherein the fibers comprise polyethylene terephthalate (PET).

25. The process according to claim 21, wherein the flexible substrate of the separator is a nonwoven, the material of the nonwoven being selected from non-woven nonelectroconductive polymeric fibers.

26. The process according to claim 21, wherein the multiple bond is a double bond.

* * * * *